July 13, 1965 M. H. DEAN 3,193,947
WRITING AID FOR THE BLIND
Filed March 26, 1962 2 Sheets-Sheet 1

INVENTOR
Madison H. Dean
BY Mason, Fenwick & Lawrence
ATTORNEYS

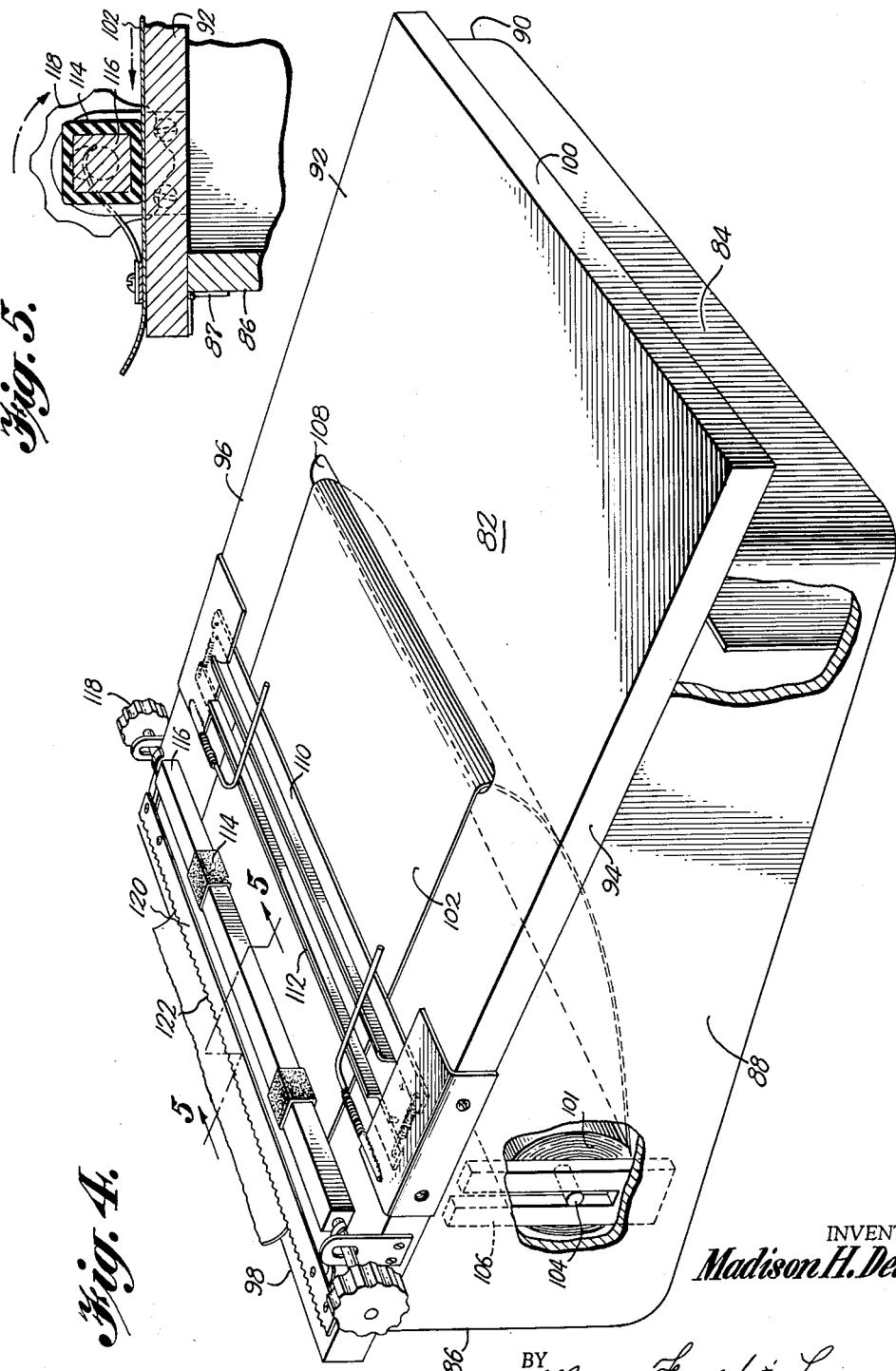

3,193,947
WRITING AID FOR THE BLIND
Madison H. Dean, P.O. Box 165, Morrilton, Ark.
Filed Mar. 26, 1962, Ser. No. 182,498
7 Claims. (Cl. 35—39)

This invention relates to a writing aid, and more particularly to a writing aid which may be readily used by persons having either a partial or total loss of vision to assist them in writing in longhand.

Although there has been considerable development in the art of braille systems and other communication aids, many persons with impaired vision still prefer to correspond in longhand. However, as can readily be appreciated, such persons experience considerable difficulty in writing in equally spaced, parallel straight lines. It is particularly difficult for such persons to confine their writing within the longitudinal limits of a normal writing space and also to ascertain the side margins of the writing paper.

It is, therefore, the general object of this invention to provide a writing aid for persons having either a partial or total loss of vision, to assist them in writing in longhand on conventional sheets of writing paper.

Another object of this invention is to provide a writing aid for persons with impaired vision, which will permit them to write in longhand on conventional sheets of writing paper in straight lines which are substantially parallel to the top edge of the writing paper in accordance with normal practice.

A further object of this invention is to provide a writing aid for persons having impaired vision having means for indicating to the writer the side margins of the paper and the longitudinal limits of a normal writing space.

A still further object of this invention is to provide a writing aid for persons having impaired vision, to assist them in writing in longhand having means provided therewith to permit the writer to advance the paper in a longitudinal direction in equal increments to further provide equal spacing of written lines.

Further objects and advantages of the invention will become apparent as the following description proceeds, when taken in conjunction with the drawings which accompany and form a part of this specification.

For a better understanding of the invention, reference may be had to the accompanying drawings, in which:

FIGURE 4 is a perspective view of another embodiment of the invention;

FIGURE 5 is a vertical cross-sectional view taken along lines 5—5 of FIGURE 4.

In accordance with the broad aspects of the present invention there is provided a writing aid comprising a support member for supporting a conventional sheet of writing paper, the support member having means to guide the paper along a predetermined path, means mounted on the writing aid for advancing the paper in equal increments in the direction of the line of travel of the paper, and means defining yieldable limits of a normal writing space.

Figure 1:
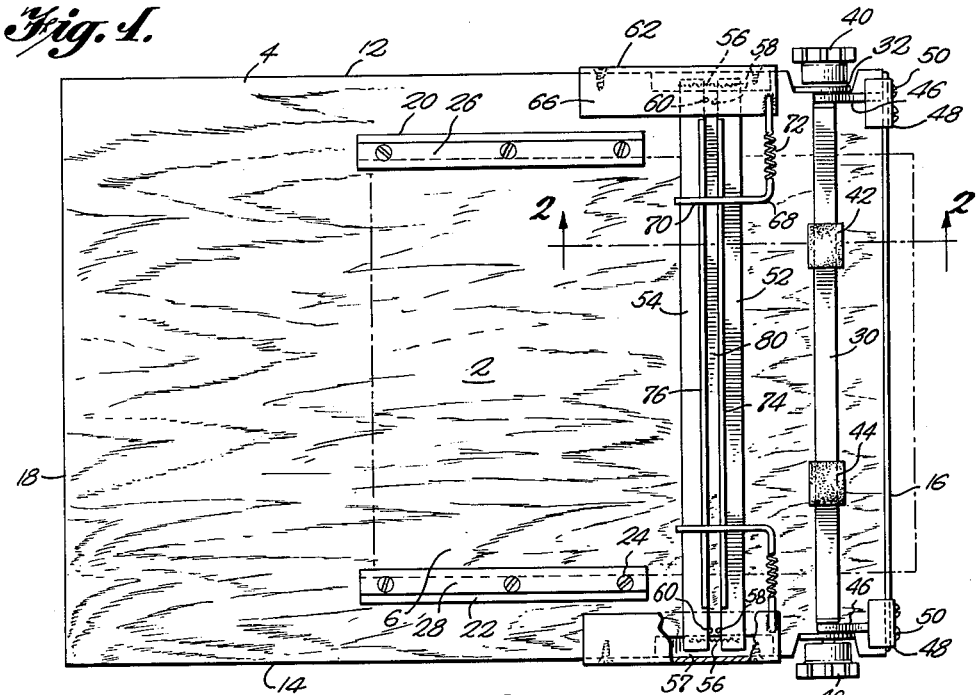
FIGURE 1 is a top plan view of an embodiment of the invention.
Figure 2:
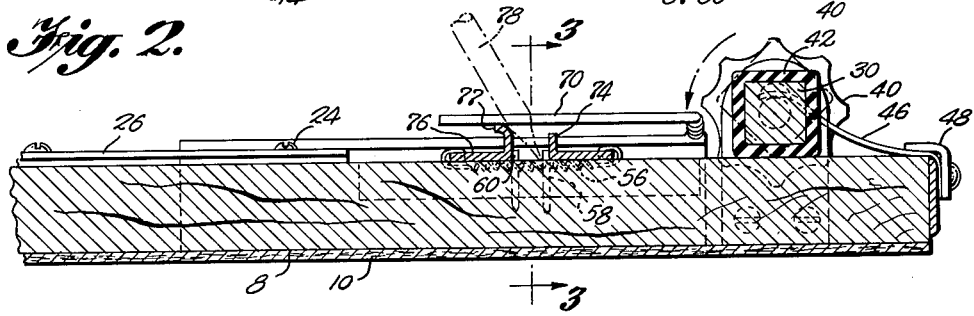
FIGURE 2 is a vertical cross-sectional view taken along lines 2—2 of FIGURE 1.
Figure 3:
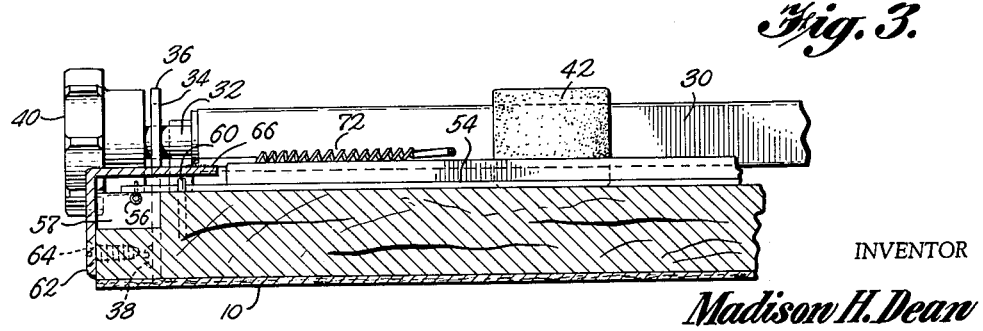
FIGURE 3 is a vertical cross-sectional view taken along lines 3—3 of FIGURE 2.

Referring to FIGURES 1 through 3, there is shown a first embodiment of the invention. This embodiment shows a support member 2 having a flat top surface 4 for supporting a sheet of conventional writing paper indicated generally at 6, a flat bottom surface 8 having a suitable felt cover 10, parallel side edges 12 and 14, a front edge 16 and a rear edge 18. Secured to the top surface 4 of the support member are a pair of guide bars 20 and 22, spaced parallel and extending in a longitudinal direction relative to the line of travel of the writing paper. The guide bars 20 and 22 are secured to the support member 2 by several spaced screws 24 or by any other suitable means. The guide bars 20 and 22 are also provided with inwardly extending flange portions 26 and 28 for receiving the sheet of writing paper thereunder, thus restricting the upward movement of the paper.

Disposed forwardly of the guide bars 20 and 22 there is provided a transversely extending spacer bar 30. The spacer bar 30 is preferably of a square cross-sectional configuration, although it can have a cross-sectional configuration of any regular polygon. The end portions of the spacer bar 30 are turned down to provide end rod portions 32, 32 which are adapted to be received by vertical slots 34, 34 in upstanding retainer plate members 36, 36. The vertical slots 34, 34 have a width substantially equal to the diameter of end rod portions 32, 32 so that the longitudinal movement of the spacer bar 30 relative to the line of travel of the writing paper is restricted. The vertical height of the slots 34 are at least sufficient to permit unrestricted vertical movement of the rod end portions 32. The upstanding plate members 36, 36 are secured to the side edges of the support member 2 equidistant from the front edge 16. The plate members 36, 36 can be secured to the support member 2 by screws 38 or in any other suitable manner. The end rod portions 32, 32 of the spacer bar 30 are provided with turning knobs 40, 40 to enable the writer to rotate spacer bar 30. The spacer bar 30 is also provided with spaced rubber grippers 42 and 44 or any other suitable friction means for gripping the sheet of paper. As best shown in FIGURE 2, the support member 2 is provided with leaf springs 46, 46 which engage the rod end portions 32, 32 to urge the spacer bar downwardly in positive engagement with the top surface 4 of the support member 2. The leaf springs 46, 46 are anchored to the support member 2 by right angle plates 48, 48 which are secured to the front edge 16 by means of screws 50 or any other suitable means.

The guide means for the writing instrument is disposed intermediate the guide bars 20 and 22 and the spacer bar 30, and comprises first, with respect to the longitudinally spaced limits relative to the line of travel of the writing paper, a pair of transversely extending, parallel spaced bars 52 and 54. The bars 52 and 54 are spaced approximately the desired height of a lower case letter such as a, c, e, o, u, etc., having no projection above or below thereof such as the letters t, h, y, p, etc. Coil tension springs 56, 56 disposed in recesses 57, 57 connect the end portions of the flat bars 52 and 54. A first set of laterally spaced stops 58, 58 are disposed on the top surface of the support members 2 and lie on a line normal to the line of travel of the writing paper. A second set of laterally spaced stops 60, 60 are also disposed on the top surface of the support member 2, lying rearwardly of the first set of stops and on a line parallel to the line adjoining the first set of stops 58, 58. The flat writing bar 52 is disposed forwardly of the first set of stops 58, 58 and the flat bar 54 is disposed rearwardly of the second set of stops 60, 60, so that the tension springs 56, 56 urge the bars together against the first and second set of stops. The sets of stops 58, 58 and 60, 60 position the spaced bars 52 and 54 which define a substantially elongated rectangular shaped writing area having yieldable top and bottom limits.

The forwardly disposed flat bar 52 is provided along its rearward edge with a vertical lip 74 and the rearwardly disposed flat bar 54 is provided along its forward edge with a vertical lip 17. The vertical lip 76 is formed higher than the vertical lip 74 and the upper portion 77 is curved rearwardly so as to provide a convenient writing angle for the writing instrument 78, as best shown in FIGURE 2. The vertical lip 74 is provided to prevent the writing instrument from overriding the relatively thin flat bar 52. With the higher vertical lip 74 in the position as shown, the flat bars 52 and 54 will accommodate a right handed writer. To accommodate a left handed writer, the flat bars 52 and 54 are reversed so that the higher vertical lip 76 of the flat bar 54 having the curved portion 77, is disposed forwardly of the vertical lip 74 of flat bar 56. In lieu of the upstanding lip portions 74 and 76, the lip on the rearwardly disposed bar 54 can be inclined approximately 45° to provide a continuous sloped writing angle along the entire length of the writing space 80.

The side margin guides comprise a pair of keeper plates 62, 62 each having a vertical portion 64 and an inwardly extending portion 66. The vertical portions 64, 64 of keeper plates 62, 62 are secured to the side edges 12 and 14 of the support member 2. Each of the inwardly extending portions 66 of the keeper plates 62, 62 restricts the vertical movement of the flat bars 52 and 54. Secured to each of the keeper plates 62, 62 is an inwardly extending wire projection 68 having a right angle end portion 70 and an intermediate coil section 72. The right angle end portions 70 are substantially in alignment with the side margin lines of the writing paper.

It will thus be appreciated that the longitudinally spaced flat bars 52 and 54 and the transversely spaced longitudinally extending portions 70, 70 define an elongated writing space 80 corresponding to the height of the small case letters such as a, e, o, etc., having yieldable limits so that upon insertion of the writing instrument therein, the writer can readily determine the longitudinal and transverse limits of a writing space and yet exceed these limits where necessary.

In operating the writing aid, a conventional sheet of writing paper 6 is inserted between the guide bars 20 and 22, and under the inwardly extending flange portions 26 and 28. The writing paper 6 is moved longitudinally towards the head of the support member 2, and passed under the flat bars 52 and 54 until the top edge of the writing paper 6 is in contact with the rubber grippers 42 and 44 of the spacer bar 30. The spacer bar 30 is then rotated counterclockwise with reference to FIGURE 2 by means of the knobs 40, 40 while continuing to advance the paper longitudinally so that a portion of rubber grippers 42 and 44 engage the top surface of the paper 6. The sheet of writing paper is then in position for the writer to begin the first line of writing in the space 80 defined by the flat bars 52 and 54 and the right angle end portions 70, 70. As the writer begins writing from left to right in space 80, the writing instrument will eventually contact the right angle end portion 70 on the right hand side, thus indicating to the writer the right hand margin, whereupon, the writer will remove the instrument and rotate the spacer bar 30 one increment. As the spacer bar is rotated the end rod portions 32 are caused to rise in the vertical slots 34 while any longitudinal movement of the spacer bar 30 relative to the line of travel of the writing paper is prevented. Thus, by restricting the longitudinal movement of the spacer bar 30, relative to the line of travel of the writing paper, the edge of the spacer bar will grip the paper and drag it forward thereunder an amount equal to the length of each side of spacer bar 30.

The writing space provided between flat bars 52 and 54 correspond to the height of the letters a, c, e, m, n, o, r, u, v, w and x. Whenever the writer wants to write letters having a greater height than the above mentioned letters, such as the letters b, d, f, h, i, k, l and t, he may exceed the upper limit of the writing space by simply moving the writing instrument against flat plate 52 which is biased against stops 58, 58 by coil springs 56, 56. For dotting the letter i and for crossing the letter t, the writing instrument is moved against the lip portion 74. To write the letters g, j, p, q, y and z, which have portions lying below the writing line, the writing instrument is moved, similarly, against the biased flat bar 54. Although alphabetical English characters have specifically been indicated herein, this is only by way of illustration and it is to be understood that the present invention can be used to facilitate the writing of characters of any written language having similar or comparable letter structure.

The side margins of each written line also can be readily detected by the contact of the writing instrument with the right angle end portions 70, 70 of wire projections 68, 68. As the writer's hand moves from left to right, the writing instrument will eventually contact right angle portions 70 disposed in alignment with the right hand margin of the paper. When the writer has reached the margin without having finished a word, he may readily exceed the margin indicator, as permitted by intermediate coil section 72.

The writer also may readily ascertain the proper writing angle of the writing instrument by locating the writing instrument in writing space 80 and then reclining the instrument so that it bears against the lip portion 76 of the rearwardly disposed flat bar 54.

In accordance with another embodiment of the present invention, there is shown in FIGURE 4 a cabinet 82, consisting of parallel rear and front panels 84 and 86 and parallel side panels 88 and 90. The side panels 88 and 90 are sloped downwardly from the front panel 86 to the rear panel 84. A removable top support member 92 having side edges 94 and 96 and front and rear edges 98 and 100 is supported on the cabinet 82. The support member 92 preferably is hinged to the front panel 86 by a hinge 87, as shown in FIGURE 5. Disposed within the cabinet 82 is a paper roll 101 either journaled to the side panels 88 and 90, or having its end journals 104 disposed in vertical slots provided in plates 106 secured to the inner sides of side panels 88 and 90. The support member 92 is provided with a transversely extending slot 108 for receiving the paper 102 from the roll 101 therethrough. The slot 108 is substantially the width of the writing paper 102, thus also providing an edge guide therefor. The means for providing the peripheral limits of a writing space and the means for advancing the writing paper are then substantially the same as heretofore described in connection with the first mentioned embodiment.

In utilizing the embodiment shown in FIGURE 4, the paper 102 from the roll 101 is passed upwardly through the opening 108, and then moved forwardly under the flat bars 110 and 112 until it comes in contact with the grippers 114 on spacer bar 116. The knobs 118, 118 are then rotated clockwise with reference to FIGURE 5, and the paper is advanced simultaneously so that the paper passes under the spacer bar and the rubber grippers are in positive contact therewith. The rotating knobs 118 are then continued to be rotated clockwise and the paper 102 is advanced in a forward direction and passed under a transversely extending bar 120 having a cutting edge 122 along its forward edge.

From the foregoing detailed description, it will be evident that there are a number of changes, adaptations, and modifications of the present invention which come within the province of those skilled in the art. However, it is intended that all such variations not departing from the spirit of the invention, be considered as within the scope thereof as limited solely by the appended claims.

What I claim is:

1. A writing aid comprising a support member having a flat top surface, the support member having means to guide a sheet of paper along a pedetermined line of travel, a spacer bar having a regular polygon cross-sectional configuration extending transversely relative to the line of travel of the paper, the spacer bar having reduced end portions defining laterally extending rod portions, laterally spaced retaining means relative to the line of travel of the paper disposed on the support member for receiving the end portions of the laterally extending rod portions of the spaced bar and restricting the longitudinal movement thereof relative to the line of travel of the paper, friction means disposed on at least a portion of the outside surfaces of the spacer bar, means disposed on the support member for biasing the spacer bar toward the top surface of the support member, means disposed on the rod portions of spacer bar for rotating the bar, laterally spaced means relative to the line of travel of the paper yieldingly disposed on the top surface of the support member defining the transverse limits of a writing space and longitudinally spaced means relative to the line of travel of the paper yieldingly disposed on the top surface of the support member defining the longitudinal limits of the writing space.

2. A writing air comprising a support member, the support member having plane top and bottom surfaces, parallel side edges and parallel front and rear edges, laterally spaced longitudinally extending parallel guide bars secured to the top surface, the guide bars having an inwardly extending, overlying flange portion for restricting the upward movement of a sheet of writing paper, a transversely extending spacer bar having a square cross-sectional configuration, the spacer bar having reduced end portions defining laterally extending rod portions, upstanding plate members secured to the side edges of the support member equidistant from the top edge, the upstanding plate members having vertical slots therethrough for receiving the end portions of the spacer bar to restrict the movement of the spacer bar in the longitudinal direction and permit movement thereof in the vertical direction, friction means disposed on at least a portion of the surfaces of the spacer bar, leaf springs secured to the front edge of the support member and bearing against the end portions of the spacer bar to bias the spacer bar toward the top surface of the support member, a first set of laterally spaced stops disposed on the top surface of the support member and lying on a line normal to the line of travel of the sheet of paper, a second set of laterally spaced stops disposed on the top surface of the support member and lying rearwardly on a line spaced parallel to the line passing through the first set of stops, a pair of transversely extending flat bars, the bars each disposed on the top surface of the support member forwardly and rearwardly of the vertical stops, the end portions of the flat bars connected by a coiled tension spring for urging the bars toward each other, the longitudinal spacing between the flat bars defining a writing space, keeper plates secured to the side edges of the support member, equidistant from the top edge, each keeper plate having an inwardly extending flange portion, inwardly extending wire projections secured to the support members, the inwardly extending wire projections having an intermediate coil section, and each of the wire projections having a longitudinally extending portion defining a side margin guide for the sheet of writing paper.

3. A writing aid comprising a support member, the support member having plane top and bottom surfaces, parallel side edges and parallel front and rear edges, laterally spaced longitudinally extending parallel guide bars secured to the top surface, the guide bars having an inwardly extending, overlying flange portion for restricting the upward movement of a sheet of writing paper, a transversely extending spacer bar having a square cross-sectional configuration, the spacer bar having reduced end portions defining laterally extending rod portions, upstanding plate members secured to the side edges of the support member equidistant from the top edge, the upstanding plate members having vertical slots therethrough for receiving the end portions of the spacer bar to restrict the movement of the spacer bar in the longitudinal direction and permit movement thereof in the vertical direction, friction means disposed on at least a portion of the surfaces of the spacer bar, leaf springs secured to the front edge of the support member and bearing against the end portions of the spacer bar to bias the spacer bar toward the top surface of the support member, a first set of laterally spaced stops disposed on the top surface of the support member and lying on a line normal to the line of travel of the sheet of paper, a second set of laterally spaced stops disposed on the top surface of the support member and lying on a line spaced parallel and rearwardly to the line passing through the first set of stops, a pair of transversely extending flat bars, the bars each disposed on the top surface of the support member forwardly and rearwardly of the vertical stops, the rearwardly disposed flat bar having a vertical lip portion on the forward portion thereof, the forwardly disposed flat bar having a vertical lip portion on the rearward portion thereof, the vertical lip portion of the rearwardly disposed flat bar extending higher than the lip portion of the forwardly disposed flat bar, the end portions of the flat bars connected by a coiled tension spring for urging the bars toward each other, the longitudinal spacing between the flat bars defining a writing space, keeper plates secured to the side edges of the support member, equidistant from the top edge, each keeper plate having an inwardly extending flange portion overlying the laterally extending flat bars, inwardly extending wire projections secured to the support member, the inwardly extending wire projections having an intermediate coil section, and each of the wire projections having a longitudinally extending portion defining a side margin guide for the sheet of writing paper.

4. A writing aid comprising a cabinet having a support member disposed thereon, the support member having a flat top surface, means disposed in the cabinet for mounting a roll of writing paper, the support member having a transversely extending slot for receiving a continuous sheet of paper therethrough from the roll, and directing the paper along a predetermined line of travel, spacer bar having a regular polygon cross-sectional configuration extending transversely relative to the line of travel of the paper, the spacer bar having reduced end portions defining laterally extending rod portions, laterally spaced retaining means disposed on the support member for receiving the end portions of the laterally extending rod portions of the spacer bar and restricting movement thereof along the line of travel of the paper disposed on the support member, friction means disposed on at least a portion of the outside surfaces of the spacer bar, means disposed on the support member and bearing on the end portions of the spacer bar to bias the spacer bar toward the top surface of the support member, means disposed on the rod portions of the spacer bar for rotating the bar, laterally spaced means relative to the line of travel of the paper yieldingly secured to the top surface of the support member defining the transverse limits of a writing space and longitudinally spaced means relative to the line of travel of the paper yieldingly secured on the top surface of the support member defining the longitudinal limits of the writing space.

5. A writing aid comprising a cabinet consisting of front and rear panels, side panels and a top support member, the top support member having a flat top surface, parallel side edges and parallel front and rear edges, a roll of writing paper disposed within the cabinet and journaled to the side panels of the cabinet, the top support member having a transversely extending slot for receiving a continuous sheet of paper from the roll and directing the paper along a predetermined line of travel, a spacer bar having a square cross-sectional configuration extending transversely relative to the line of travel of the paper, the spacer bar having reduced end portions defining laterally extending rod portions, upstanding plate members secured to the side edges of the support member equidistant from the top edge, the upstanding plate members having vertical slots therethrough for receiving the end portions of the spacer bar to restrict the movement of the spacer bar in a direction along the line of travel of the paper and permit movement thereof in a vertical direction, friction means disposed on at least a portion of the surfaces of the spacer bar, leaf springs secured to the front edge of the support member and engaging the end portions of the spacer bar to bias the spacer bar toward the top surface of the support member, a first set of transversely spaced stops disposed on the top surface of the support member and lying on a line normal to the line of travel of the paper, a second set of transversely spaced stops disposed on the top surface of the support member and lying in a line spaced parallel and rearwardly of the line passing through the first set of stops, a pair of flat bars, the bars each disposed on the top surface of the support member, forwardly and rearwardly of the vertical stops, the end portions of the flat bars connected by a coiled tension spring for urging the bars toward each other, the longitudinal spacing between the flat bars defining a writing space, keeper plates secured to the side edges of the support member, equidistant from the top edge, each keeper plate having an inwardly extending flange portion, inwardly extending wire projections secured to the support member, the inwardly extending wire projection having an intermediate coil section, and each of the wire projections having a longitudinally extending portion defining a side margin guide for the continuous sheet of writing paper.

6. A writing aid comprising a cabinet consisting of front and rear panels, side panels, and a flat top support member, the top support member having top surface, parallel side edges and parallel front and rear edges, a roll of writing paper disposed within the cabinet and journaled to the side panels of the cabinet, the top support member having a transversely extending slot for receiving a continuous sheet of paper from the roll therethrough and directing the paper along a predetermined line of travel, a spacer bar having a square cross-sectional configuration extending transversely relative to the line of travel of the paper, the spacer bar having reduced end portions defining laterally extending rod portions, upstanding plate members secured to the side edges of the support member equidistant from the top edge, the upstanding plate members having vertical slots therethrough for receiving the end portions of the spacer bar to restrict the movement of the spacer bar in a direction along the line of travel of the paper and permit movement thereof in a vertical direction, friction means disposed on at least a portion of the surfaces of the spacer bar, leaf springs secured to the front edge of the support member and engaging the end portions of the spacer bar to bias the spacer bar toward the top surface of the support member, a first set of transversely spaced stops disposed on the top surface of the support member and lying on a line normal to the line of travel of the paper, a second set of transversely spaced stops disposed on the top surface of the support member and lying in a line spaced parallel and rearwardly of the line passing through the first set of stops, a pair of flat bars, the bars each disposed on the top surface of the support member, forwardly and rearwardly of the vertical stops, the rearwardly disposed flat bar having a lip portion extending vertically and then curved rearwardly on the forward portion thereof, the forwardly disposed flat bar having a vertical lip portion on the rearward portion thereof, the lip portion of the rearwardly disposed flat bar extending higher than the lip portion of the forwardly disposed flat bar, the end portions of the flat bars connected by a coiled tension spring for urging the bars toward each other, the longitudinal spacing between the flat bars defining a writing space, keeper plates secured to the side edges of the support member, equidistant from the top edge, each keeper plate having an inwardly extending flange portion, inwardly extending wire projections secured to the support member, the inwardly extending rod members having an intermediate coil section, and each of the wire projections having a longitudinally extending portion defining a side margin guide for the roll of writing paper.

7. A writing aid comprising a cabinet consisting of front and rear panels, side panels, and a flat top support member, the top support member having plane top and bottom surfaces, parallel side edges and parallel front and rear edges, a roll of writing paper disposed within the cabinet and journaled to the side panels of the cabinet, the top support member having a transversely extending slot for receiving a continuous sheet of paper therethrough and directing the paper along a predetermined line of travel, a spacer bar having a square cross-sectional configuration extending transversely relative to the line of travel of the paper, the spacer bar having reduced end portions defining laterally extending rod portions, upstanding plate members secured to the side edges of the support member equidistant from the top edge, the upstanding plate members having vertical slots therethrough for receiving the end portions of the spacer bar to restrict the movement of the spacer bar in a direction along the line of travel of the paper and permit movement thereof in a vertical direction, friction means disposed on at least a portion of the surfaces of the spacer bar, leaf springs secured to the front edge of the support members and engaging the end portions of the spacer bar to bias the spacer bar toward the top surface of the support member, a bar having a front cutting edge disposed forwardly of the spacer bar and lying normal to the line of travel of the paper, the cutting bar having its ends secured to the top surface of the support member and having its intermediate portion raised to permit passage of the sheet of paper thereunder, a first set of transversely spaced stops disposed on the top surface of the support member and lying on a line normal to the line of travel of the sheet of paper, a second set of transversely spaced stops disposed on the top surface of the support member and lying in a line spaced parallel and rearwardly of the line passing through the first set of stops, a pair of flat bars, the bars each disposed on the top surface of the support member, forwardly and rearwardly of the vertical stops, the rearwardly disposed flat bar having a rearwardly inclined lip on the forward portion thereof, the forwardly disposed flat bar having a vertical lip portion on the rearward portion thereof, the vertical lip portion of the rearwardly disposed flat bar extending higher than the lip portion of the forwardly disposed flat bar, the end portions of the flat bars connected by a coiled tension spring for urging the bars toward each other, the longitudinal spacing between the flat bars defining a writing space, keeper plates secured to the side edges of the support member, equidistant from the top edge, each keeper plate having an inwardly extending flange portion, inwardly extending wire projections secured to the support member, the inwardly extending wire projection having an intermediate coil section, and each of the wire projection members having a longitudinally extending portion defining a side margin guide for the roll of writing paper.

References Cited by the Examiner
UNITED STATES PATENTS

| | | | |
|---|---|---|---|
| 547,800 | 1/58 | Brown | 35—38 |
| 769,294 | 9/04 | Bellamy | 281—11 |
| 1,259,866 | 3/18 | Home | 35—38 |
| 2,562,479 | 7/51 | Spikes | 35—38 X |
| 2,819,541 | 1/58 | Brown | 35—38 |
| 2,887,790 | 5/59 | Hills | 35—38 |
| 2,896,970 | 7/59 | Cooke | 282—21 X |
| 3,048,393 | 8/62 | Furr et al. | 271—36 X |

EUGENE R. CAPOZIO, *Primary Examiner.*

LEO SMILOW, LAWRENCE CHARLES, JEROME SCHNALL, *Examiners.*